(12) United States Patent
Frushour

(10) Patent No.: US 8,858,665 B2
(45) Date of Patent: Oct. 14, 2014

(54) METHOD FOR MAKING FINE DIAMOND PDC

(76) Inventor: Robert Frushour, Ann Arbor, MI (US)

(*) Notice: Subject to any disclaimer, the term of this patent is extended or adjusted under 35 U.S.C. 154(b) by 365 days.

(21) Appl. No.: 13/241,897

(22) Filed: Sep. 23, 2011

(65) Prior Publication Data

US 2012/0272583 A1    Nov. 1, 2012

Related U.S. Application Data

(60) Provisional application No. 61/480,094, filed on Apr. 28, 2011, provisional application No. 61/487,878, filed on May 19, 2011.

(51) Int. Cl.
  *B01J 3/06*  (2006.01)
  *B22F 3/14*  (2006.01)
  *B24D 18/00*  (2006.01)

(52) U.S. Cl.
  CPC .......... *B01J 3/062* (2013.01); *B01J 2203/0655* (2013.01); *B01J 2203/0685* (2013.01); *B01J 2203/062* (2013.01)
  USPC .............................................. 51/307; 51/309

(58) Field of Classification Search
  USPC ..................... 51/296, 307, 309; 175/327, 434
  See application file for complete search history.

(56) References Cited

U.S. PATENT DOCUMENTS

| | | | |
|---|---|---|---|
| 2,238,351 A | 4/1941 | Van Der Pyl | |
| 2,941,248 A | 6/1960 | Hall | |
| 3,083,080 A | 3/1963 | Bovenkerk | |
| 3,134,739 A | 5/1964 | Cannon | |
| 3,136,615 A | 6/1964 | Bovenkerk et al. | |
| 3,141,746 A | 7/1964 | De Lai | |
| 3,233,988 A | 2/1966 | Wentorf, Jr. et al. | |
| 3,297,407 A | 1/1967 | Wentorf, Jr. | |
| 3,423,177 A | 1/1969 | Bovenkerk | |
| 3,574,580 A | 4/1971 | Stromberg et al. | |
| 3,745,623 A | 7/1973 | Wentorf, Jr. et al. | |
| 4,024,675 A * | 5/1977 | Naidich et al. | 51/296 |
| 4,034,066 A | 7/1977 | Strong et al. | |
| 4,042,673 A | 8/1977 | Strong | |
| 4,063,909 A * | 12/1977 | Mitchell | 51/309 |
| 4,073,380 A | 2/1978 | Strong et al. | |
| 4,108,614 A | 8/1978 | Mitchell | |
| 4,124,690 A | 11/1978 | Strong et al. | |
| 4,151,686 A | 5/1979 | Lee et al. | |
| 4,224,380 A | 9/1980 | Bovenkerk et al. | |
| 4,247,304 A | 1/1981 | Morelock | |
| 4,255,165 A | 3/1981 | Dennis et al. | |
| 4,268,276 A | 5/1981 | Bovenkerk | |
| 4,303,442 A | 12/1981 | Hara et al. | |
| 4,311,490 A | 1/1982 | Bovenkerk et al. | |
| 4,373,593 A | 2/1983 | Phaal et al. | |
| 4,387,287 A | 6/1983 | Marazzi | |

(Continued)

FOREIGN PATENT DOCUMENTS

| | | |
|---|---|---|
| EP | 061954 A1 | 12/1980 |
| EP | 0300699 A2 | 1/1989 |
| EP | 0329954 A2 | 8/1989 |
| EP | 0462091 A1 | 12/1991 |

(Continued)

*Primary Examiner* — Pegah Parvini
(74) *Attorney, Agent, or Firm* — Young Basile, P.C.

(57) ABSTRACT

A method for making a PDC cutting element for use in rock drilling containing sub-micron size diamond particles within the diamond body. Metals that do not readily dissolve carbon are employed to limit the dissolution and re-precipitation of fine diamond during the sintering of the diamond to the substrate.

12 Claims, 1 Drawing Sheet

(56) References Cited

U.S. PATENT DOCUMENTS

| | | | |
|---|---|---|---|
| 4,412,980 | A | 11/1983 | Tsuji et al. |
| 4,481,016 | A | 11/1984 | Campbell et al. |
| 4,486,286 | A | 12/1984 | Lewin et al. |
| 4,504,519 | A | 3/1985 | Zelez |
| 4,522,633 | A | 6/1985 | Dyer |
| 4,525,179 | A | 6/1985 | Gigl |
| 4,534,773 | A | 8/1985 | Phaal et al. |
| 4,556,407 | A | 12/1985 | Fecik et al. |
| 4,560,014 | A | 12/1985 | Geczy |
| 4,570,726 | A | 2/1986 | Hall |
| 4,572,722 | A | 2/1986 | Dyer |
| 4,604,106 | A | 8/1986 | Hall et al. |
| 4,605,343 | A | 8/1986 | Hibbs, Jr. et al. |
| 4,606,738 | A | 8/1986 | Hayden |
| 4,621,031 | A | 11/1986 | Scruggs |
| 4,636,253 | A | 1/1987 | Nakai et al. |
| 4,645,977 | A | 2/1987 | Kurokawa et al. |
| 4,662,348 | A | 5/1987 | Hall et al. |
| 4,664,705 | A | 5/1987 | Horton et al. |
| 4,707,384 | A | 11/1987 | Schachner et al. |
| 4,726,718 | A | 2/1988 | Meskin et al. |
| 4,766,040 | A | 8/1988 | Hillert et al. |
| 4,776,861 | A | 10/1988 | Frushour |
| 4,792,001 | A | 12/1988 | Zijsling |
| 4,793,828 | A | 12/1988 | Burnand |
| 4,797,241 | A | 1/1989 | Peterson et al. |
| 4,802,539 | A | 2/1989 | Hall et al. |
| 4,807,402 | A | 2/1989 | Rai |
| 4,828,582 | A | 5/1989 | Frushour |
| 4,844,185 | A | 7/1989 | Newton, Jr. et al. |
| 4,861,350 | A | 8/1989 | Phaal et al. |
| 4,871,377 | A | 10/1989 | Frushour |
| 4,899,922 | A | 2/1990 | Slutz et al. |
| 4,919,220 | A | 4/1990 | Fuller et al. |
| 4,940,180 | A | 7/1990 | Martell |
| 4,943,488 | A | 7/1990 | Sung et al. |
| 4,944,772 | A | 7/1990 | Cho |
| 4,976,324 | A | 12/1990 | Tibbitts |
| 5,011,514 | A | 4/1991 | Cho et al. |
| 5,027,912 | A | 7/1991 | Juergens |
| 5,030,276 | A | 7/1991 | Sung et al. |
| 5,092,687 | A | 3/1992 | Hall |
| 5,116,568 | A | 5/1992 | Sung et al. |
| 5,127,923 | A | 7/1992 | Bunting et al. |
| 5,133,332 | A | 7/1992 | Tanaka et al. |
| 5,135,061 | A | 8/1992 | Newton, Jr. |
| 5,176,720 | A | 1/1993 | Martell et al. |
| 5,186,725 | A | 2/1993 | Martell et al. |
| 5,199,832 | A | 4/1993 | Meskin et al. |
| 5,205,684 | A | 4/1993 | Meskin et al. |
| 5,213,248 | A | 5/1993 | Horton et al. |
| 5,236,674 | A | 8/1993 | Frushour |
| 5,238,074 | A | 8/1993 | Tibbitts et al. |
| 5,244,368 | A | 9/1993 | Frushour |
| 5,264,283 | A | 11/1993 | Waldenstrom et al. |
| 5,337,844 | A | 8/1994 | Tibbitts |
| 5,370,195 | A | 12/1994 | Keshavan et al. |
| 5,379,853 | A | 1/1995 | Lockwood et al. |
| 5,439,492 | A | 8/1995 | Anthony et al. |
| 5,451,430 | A | 9/1995 | Anthony et al. |
| 5,464,068 | A | 11/1995 | Najafi-Sani |
| 5,468,268 | A | 11/1995 | Tank et al. |
| 5,496,638 | A | 3/1996 | Waldenstrom et al. |
| 5,505,748 | A | 4/1996 | Tank et al. |
| 5,510,193 | A | 4/1996 | Cerutti et al. |
| 5,523,121 | A | 6/1996 | Anthony et al. |
| 5,524,719 | A | 6/1996 | Dennis |
| 5,560,716 | A | 10/1996 | Tank et al. |
| 5,607,024 | A | 3/1997 | Keith et al. |
| 5,620,382 | A | 4/1997 | Cho et al. |
| 5,624,068 | A | 4/1997 | Waldenstrom et al. |
| 5,667,028 | A | 9/1997 | Truax et al. |
| 5,672,395 | A | 9/1997 | Anthony et al. |
| 5,718,948 | A | 2/1998 | Ederyd et al. |
| 5,722,499 | A | 3/1998 | Nguyen et al. |
| 5,776,615 | A | 7/1998 | Wong et al. |
| 5,833,021 | A | 11/1998 | Mensa-Wilmot et al. |
| 5,855,996 | A | 1/1999 | Corrigan et al. |
| 5,897,942 | A | 4/1999 | Karner et al. |
| 5,921,500 | A | 7/1999 | Ellis et al. |
| 5,954,147 | A | 9/1999 | Overstreet et al. |
| 5,981,057 | A | 11/1999 | Collins |
| 6,009,963 | A | 1/2000 | Chaves et al. |
| 6,030,595 | A | 2/2000 | Sumiya et al. |
| 6,050,354 | A | 4/2000 | Pessier et al. |
| 6,063,333 | A | 5/2000 | Dennis |
| 6,123,612 | A | 9/2000 | Goers |
| 6,126,741 | A | 10/2000 | Jones et al. |
| 6,202,770 | B1 | 3/2001 | Jurewicz et al. |
| 6,248,447 | B1 | 6/2001 | Griffin et al. |
| 6,269,894 | B1 | 8/2001 | Griffin |
| 6,298,930 | B1 | 10/2001 | Sinor et al. |
| 6,344,149 | B1 | 2/2002 | Oles |
| 6,401,845 | B1 | 6/2002 | Fielder |
| 6,443,248 | B2 | 9/2002 | Yong et al. |
| 6,443,249 | B2 | 9/2002 | Beuershausen et al. |
| 6,460,631 | B2 | 10/2002 | Dykstra et al. |
| 6,544,308 | B2 | 4/2003 | Griffin et al. |
| 6,562,462 | B2 | 5/2003 | Griffin et al. |
| 6,582,513 | B1 | 6/2003 | Linares et al. |
| 6,585,064 | B2 | 7/2003 | Griffin et al. |
| 6,589,640 | B2 | 7/2003 | Griffin et al. |
| 6,592,985 | B2 | 7/2003 | Griffin et al. |
| 6,601,662 | B2 | 8/2003 | Matthias et al. |
| 6,681,098 | B2 | 1/2004 | Pfenninger et al. |
| 6,739,214 | B2 | 5/2004 | Griffin et al. |
| 6,749,033 | B2 | 6/2004 | Griffin et al. |
| 6,797,326 | B2 | 9/2004 | Griffin et al. |
| 6,811,610 | B2 | 11/2004 | Frushour et al. |
| 6,846,341 | B2 | 1/2005 | Middlemiss |
| 6,852,414 | B1 | 2/2005 | Frushour |
| 6,861,137 | B2 | 3/2005 | Hughes et al. |
| 6,878,447 | B2 | 4/2005 | Griffin et al. |
| 7,000,715 | B2 | 2/2006 | Sinor et al. |
| 7,070,635 | B2 | 7/2006 | Frushour |
| 7,316,279 | B2 | 1/2008 | Wiseman et al. |
| 7,517,588 | B2 | 4/2009 | Frushour |
| 7,595,110 | B2 | 9/2009 | Frushour |
| 7,757,791 | B2 | 7/2010 | Belnap et al. |
| 2004/0062928 | A1* | 4/2004 | Raghavan et al. ............ 428/408 |
| 2005/0115744 | A1 | 6/2005 | Griffin et al. |
| 2008/0115421 | A1 | 5/2008 | Sani |
| 2008/0223623 | A1 | 9/2008 | Keshavan et al. |
| 2009/0152018 | A1 | 6/2009 | Sani |
| 2010/0032006 | A1 | 2/2010 | Basol |
| 2011/0083908 | A1 | 4/2011 | Shen et al. |
| 2011/0088954 | A1* | 4/2011 | Digiovanni et al. .......... 175/336 |

FOREIGN PATENT DOCUMENTS

| | | |
|---|---|---|
| EP | 0462955 A1 | 12/1991 |
| EP | 0480895 A2 | 4/1992 |
| EP | 0500253 A1 | 8/1992 |
| EP | 0595630 A1 | 5/1994 |
| EP | 0595631 A1 | 5/1994 |
| EP | 0612868 A1 | 8/1994 |
| EP | 0617207 A2 | 9/1994 |
| EP | 0671482 A1 | 9/1995 |
| EP | 0787820 A2 | 8/1997 |
| EP | 0860515 A1 | 8/1998 |
| EP | 1190791 A2 | 3/2002 |
| EP | 2048927 A2 | 4/2009 |
| GB | 2048927 A | 12/1980 |
| GB | 2261894 A | 6/1993 |
| GB | 2268768 A | 1/1994 |
| GB | 2323110 A | 9/1998 |
| GB | 2323398 A | 9/1998 |
| JP | 59219500 A | 12/1984 |
| WO | 9323204 A1 | 11/1993 |
| WO | 9634131 A1 | 10/1996 |
| WO | 0028106 A1 | 5/2000 |
| WO | 2004022821 A1 | 3/2004 |

\* cited by examiner

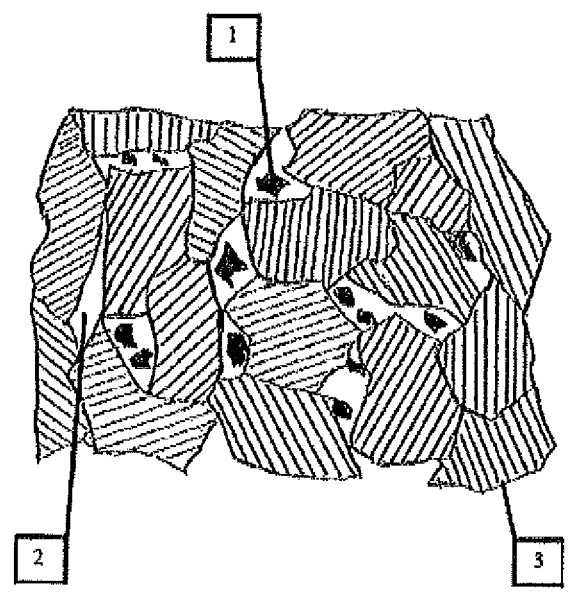

METHOD FOR MAKING FINE DIAMOND PDC

CROSS REFERENCE TO CO-PENDING APPLICATION

This application claims priority benefit of the U.S. Provisional Application Ser. Nos. 61/480,094 filed on Apr. 28, 2011 and 61/487,878 filed on May 19, 2011 in the name of R. Frushour, both of which are incorporated herein in their entirety.

BACKGROUND

1. Field of the Invention

The present invention relates to a sintered polycrystalline diamond composite for use in rock drilling, machining of wear resistant materials, and other operations which require the high abrasion resistance or wear resistance of a diamond surface. Specifically, this invention relates to such bodies that include a polycrystalline diamond layer attached to a cemented carbide substrate via processing at ultrahigh pressures and temperatures.

2. Description of the Art

It is well known in the art to form a polycrystalline diamond cutting element by sintering diamond particles into a compact using a high pressure, high temperature (HPHT) press and a suitable catalyst sintering aid. Apparatus and techniques to accomplish the necessary sintering of the diamond particles are disclosed in U.S. Pat. No. 2,941,248 to Hall and U.S. Pat. No. 3,141,746 to DeLai.

U.S. Pat. No. 3,745,623 Wentorf et al. teaches sintering of the diamond mass in conjunction with tungsten carbide to produce a composite compact (PDC) in which the diamond particles are bonded directly to each other and to a cemented carbide substrate.

It has been proven challenging to produce a PDC with an average grain size of diamond less than about 1 micron. This sub-micron diamond powder is difficult to produce and handle during the processes involved in sintering a uniform diamond body and attaching it to a substrate. Additionally the property of this material to agglomerate and its low packing density produces a diamond compact containing re-precipitated diamond crystals that results in lowering the strength of the overall structure.

Attempts to overcome the difficulties in sintering sub-micron diamond have been proposed by Hara et al. in U.S. Pat. No. 4,303,442. These solutions, however, do not provide a PDC with enough uniformity in abrasion and impact resistance to be useful in drill bits for deep hole oil and gas drilling.

It is well known in the art to mix a catalyst with the diamond prior to HPHT sintering in order to provide a uniform mixture of these materials. This is especially helpful when working with very fine grain diamond that is difficult to penetrate with a catalyst when the fine grain diamond is densely compacted. A problem still exists after the catalyst melts since it dissolves the fine diamond grains which re-precipitate as larger diamond crystals in a non-uniform distribution throughout the sintered mass. U.S. Patent Application No. 20090178345 to Russell et al attempts to solve this problem by milling the diamond with a catalyst that itself has a very fine grain size. Unfortunately these finer size catalyst particles combine after melting and create the same problems of dissolving the very fine diamond crystals.

Thus, there remains a need to effectively control the grain size of very fine diamond used in the formation of polycrystalline diamond cutting tools.

SUMMARY

A method of making a PDC cutting element wherein a non-reactive material that exhibits low solubility for carbon is added to an unsintered mass of diamond crystals that fills an interconnected pore network during a high pressure, high temperature process to equalize the pressure between the pore network and the external mass of diamond crystals.

The diamond mass is a mixture of various size crystals in which some of the diamond crystals are smaller in size than the holes in the interconnected pore network.

The non-reactive material can be copper or an alloy of copper and a catalyst metal.

In another aspect, a method of making a PCD cutting element wherein a non-reactive material that exhibits low solubility for carbon is added to an unsintered mass of diamond crystal that fills an interconnected pore network during a high pressure, high temperature process to equalize the pressure between the pore network and the external mass of diamond crystals. The mixture is sintered to bond the mass to a substrate at high pressure and high temperature.

In another aspect, a method of making PCD cutting element includes the step of coating diamond crystals that are smaller in size than the pores of a interconnected pore network of a larger diamond mass with a non-reactive material that exhibit low solubility for carbon.

DETAILED DESCRIPTION OF THE DRAWING

FIG. 1 is an illustration of a compressed mass of diamond crystals showing the interconnected empty pore network.

DETAILED DESCRIPTION

The present method incorporates a metal, which is compatible with the catalyst or other sintering aid used to sinter a diamond mass, and does not dissolve carbon. The use of such material retards the dissolution of diamond crystals thereby eliminating recrystallization of very fine diamond into larger crystals that weaken the diamond body or alter its abrasion characteristics.

When loose diamond abrasive is compacted under high pressure there remains an empty or void pore network throughout the diamond mass. This is a result of the high compressive strength of diamond. Another characteristic of compressed diamond is its ability to form bridges within the compressed mass thereby creating areas of both low and high pressure within the mass.

FIG. 1 shows a small diamond crystal 1, which is contained in a large hole of a pore network 2, is not under pressure since the larger diamond crystals 3 do all of the work of supporting the structure under pressure. When the molten catalyst sweeps through the pore network it dissolves the small crystal and converts it to graphite. After the molten catalyst fills the pore network, the pressure is equalized so that dissolved carbon from the small crystal, which combines with carbon from other small crystals and from exposed faces of the larger diamond crystals, re-precipitates as a larger diamond crystal. If a metal or other material that doesn't react with diamond fills the empty pores, the pressure on the smaller crystals in the mass will increase to where diamond is the stable phase prior to catalyst sweep through. This retards the dissolution and re-precipitation of the smaller diamond crystals.

The metal can be added to the un-sintered mass of diamond as a powder by a milling or other procedure or it can be placed between the diamond mass and the substrate. The metal selected should have a melting point sufficiently below that of the catalyst so that it will fully penetrate the mass of diamond crystals prior to the sintering action that is to take place. As an example, copper that does not readily dissolve carbon can be used to infiltrate the diamond mass prior to the sweep through of a catalyst metal, such as cobalt, that has a higher melting point.

In an alternate method, the metal used to retard diamond dissolution is alloyed with a catalyst. For example, copper that does not readily dissolve carbon can be easily alloyed with catalytic metal, such as cobalt. Copper can be alloyed with many of the known catalyst metals and the percentage of each metal can be adjusted to control the reactivity with carbon in the diamond.

In another exemplary method, the fine diamond crystals may be coated with a non-reactive material that doesn't readily dissolve carbon. The coating may be thin enough so that it does not entirely fill the holes in the pore network of the larger mass. In this example, the coating serves to retard the dissolution of the fine diamond crystals into the catalyst used to sinter the diamond mass.

What is claimed is:

1. A method of making a PDC cutting element comprising:
   adding a nonreactive material that exhibits low solubility for carbon to an unsintered mass of diamond crystals, the non-reactive material filling an interconnected pore network between the diamond crystals during a high-pressure high-temperature process to equalize the pressure between the pore network and an external mass, whereby the equalized pressure retards dissolution of the diamond crystals and reprecipitation of the diamond crystals into larger crystals during sintering.

2. The method of claim 1 wherein the diamond mass is a mixture of various size diamond crystals wherein some of the diamond crystals are smaller than the holes in the interconnected pore network.

3. The method of claim 1 wherein the nonreactive material is copper.

4. The method of claim 1 wherein the nonreactive material is an alloy of copper and a catalyst metal.

5. A method of making a PDC cutting element comprising:
   adding a nonreactive material exhibits low solubility for carbon to an unsintered mass of diamond crystals, to form a mixture, the non-reactive material filling an interconnected pore network between diamond crystals during a high-pressure high-temperature process to equalize the pressure between the pore network and an external mass, whereby the equalized pressure retards dissolution of the diamond crystals and reprecipitation of the diamond crystals into larger crystals during sintering; and
   sintering the mixture to bond the mass of diamond crystals to a substrate at high pressure and high temperature.

6. The method of claim 5 wherein:
   the diamond crystal mass is a mixture of various size diamond crystals wherein some of the diamond crystals are smaller than the holes in the interconnected pore network.

7. The method of claim 5 wherein the nonreactive material is copper.

8. The method of claim 5 wherein the nonreactive material is an alloy of copper and a catalyst metal.

9. A method of making a PDC cutting element comprising:
   coating diamond crystals that are smaller than pores of an interconnected pore network of a larger diamond crystal mass with a non-reactive material that exhibits low solubility for carbon, whereby the non-reactive material equalizes pressure between the pore network and the diamond crystals to retard dissolution of the diamond crystals and reprecipitation of the diamond crystals into larger crystals during sintering.

10. The method of claim 9 wherein the diamond mass is a mixture of various size diamond crystals wherein some of the diamond crystals are smaller than the holes in the interconnected pore network.

11. The method of claim 9 wherein the nonreactive material is copper.

12. The method of claim 9 wherein the nonreactive material is an alloy of copper and a catalyst metal.

* * * * *